(12) United States Patent
Whelan et al.

(10) Patent No.: US 8,989,652 B2
(45) Date of Patent: Mar. 24, 2015

(54) ADVANCED TIMING AND TIME TRANSFER FOR SATELLITE CONSTELLATIONS USING CROSSLINK RANGING AND AN ACCURATE TIME SOURCE

(75) Inventors: David A. Whelan, Newport Coast, CA (US); Gregory M. Gutt, Ashburn, VA (US); Peter M. Fyfe, Irvine, CA (US)

(73) Assignee: The Boeing Company, Chicago, IL (US)

( * ) Notice: Subject to any disclaimer, the term of this patent is extended or adjusted under 35 U.S.C. 154(b) by 272 days.

(21) Appl. No.: 13/418,200

(22) Filed: Mar. 12, 2012

(65) Prior Publication Data

US 2013/0065514 A1    Mar. 14, 2013

Related U.S. Application Data

(60) Provisional application No. 61/533,122, filed on Sep. 9, 2011.

(51) Int. Cl.
| | |
|---|---|
| *H04B 7/19* | (2006.01) |
| *H04B 7/185* | (2006.01) |
| *G01S 13/76* | (2006.01) |
| *G01S 19/11* | (2010.01) |

(52) U.S. Cl.
CPC .......... *H04B 7/18521* (2013.01); *G01S 13/765* (2013.01); *G01S 19/11* (2013.01)
USPC ............................ 455/13.2; 370/324; 375/354

(58) Field of Classification Search
CPC ........................... H04B 7/2125; H04B 7/18513
USPC ......................................................... 455/13.2
See application file for complete search history.

(56) References Cited

U.S. PATENT DOCUMENTS

| | | | | |
|---|---|---|---|---|
| 5,267,167 A | * | 11/1993 | Glickman | 701/531 |
| 5,490,076 A | * | 2/1996 | Rawicz et al. | 455/98 |
| 5,506,781 A | * | 4/1996 | Cummiskey et al. | 701/531 |
| 5,935,196 A | * | 8/1999 | Brodie et al. | 701/480 |
| 6,009,376 A | * | 12/1999 | Brodie et al. | 701/480 |

(Continued)

FOREIGN PATENT DOCUMENTS

WO    9534142 A1    12/1995

OTHER PUBLICATIONS

Huang et al. ("Autonomous Time Synchronization Algorithm and Time Synchronization Link Performance Analysis in the Satellite Constellation", Sep. 23, 2010, Wireless Communications Networking and Mobile Computing (WICOM)), pp. 1-4, ISBN: 978-1-4244-3709-2.*

(Continued)

*Primary Examiner* — Hai V Nguyen
(74) *Attorney, Agent, or Firm* — Vista IP Law Group LLP; Cynthia A. Dixon (57) ABSTRACT

A system, method, and apparatus for advanced timing and time transfer for satellite constellations using crosslink ranging and an accurate time source are disclosed herein. In particular, the present disclosure relates generally to systems for providing improved positioning, navigation, and/or timing information for oscillator calibration and more specifically, to use at least one satellite with accessibility to an accurate time source to calibrate the local oscillator on a crosslink paired satellite. In at least, one embodiment, time synchronization on a subset of satellites with crosslinking capabilities is used to distribute time through a network of crosslinked satellites.

27 Claims, 7 Drawing Sheets

(56) References Cited

U.S. PATENT DOCUMENTS

| | | | |
|---|---|---|---|
| 6,128,286 A * | 10/2000 | Leopold et al. | 370/316 |
| 6,133,870 A | 10/2000 | Wehner | |
| 6,487,512 B1 * | 11/2002 | Tursich | 702/89 |
| 7,042,392 B2 | 5/2006 | Whelan et al. | |
| 7,366,125 B1 * | 4/2008 | Elliott | 370/316 |
| 7,372,400 B2 | 5/2008 | Cohen et al. | |
| 7,468,696 B2 | 12/2008 | Bornholdt | |
| 7,489,926 B2 | 2/2009 | Whelan et al. | |
| 7,554,481 B2 | 6/2009 | Cohen et al. | |
| 7,579,986 B2 | 8/2009 | DiEsposti | |
| 7,579,987 B2 | 8/2009 | Cohen et al. | |
| 7,583,225 B2 | 9/2009 | Cohen et al. | |
| 7,619,559 B2 | 11/2009 | DiEsposti | |
| 7,688,261 B2 | 3/2010 | DiEsposti | |
| 7,725,259 B2 * | 5/2010 | Schwartz | 701/531 |
| 8,186,626 B1 * | 5/2012 | Liu et al. | 244/158.8 |
| 8,240,611 B2 * | 8/2012 | Vance | 244/158.4 |
| 8,466,835 B2 * | 6/2013 | Elwell et al. | 342/357.62 |
| 8,706,319 B2 * | 4/2014 | Prunean | 701/2 |
| 2005/0159891 A1 | 7/2005 | Cohen et al. | |
| 2008/0059059 A1 | 3/2008 | Cohen et al. | |
| 2008/0143605 A1 | 6/2008 | Bornholdt | |
| 2008/0146246 A1 | 6/2008 | Bornholdt | |
| 2009/0174597 A1 | 7/2009 | DiLellio et al. | |
| 2009/0228210 A1 | 9/2009 | Gutt | |
| 2009/0315764 A1 | 12/2009 | Cohen et al. | |
| 2009/0315769 A1 | 12/2009 | Whelan et al. | |
| 2010/0171652 A1 | 7/2010 | Gutt et al. | |

OTHER PUBLICATIONS

Huang et al. ("Autonomous Time Synchronization Algorithm and Time Synchronization Link Performance Analysis in the Satellite Constellation", Wireless Communications Networking and Mobile Computing (WICOM), 2010 6th International Conference, IEEE, Piscataway, NJ, USA, Sep. 23, 2010, pp. 1-4, XP031827822, ISBN: 978-1-4244-3709-2.*

International Search Report, PCT Application Ser. No. PCT/US2012/048973, Oct. 18, 2012.

Written Opinion of the International Searching Authority, PCT Application Ser. No. PCT/US2012/048973, Oct. 18, 2012.

Huang Feijiang, et al., "Autonomous Time Synchronization Algorithm and Time Synchronization Link Performance Analysis in the Satellite Constellation", Wireless Communications Networking and Mobile Computing (WICOM), 2010 6th International Conference ON, IEEE, Piscataway, NJ, USA, Sep. 23, 2010, pp. 1-4, XP031827822, ISBN: 978-1-4244-3708-5, p. 1, right-hand column-p. 2, left-hand column.

* cited by examiner

ADVANCED TIMING AND TIME TRANSFER FOR SATELLITE CONSTELLATIONS USING CROSSLINK RANGING AND AN ACCURATE TIME SOURCE

CROSS-REFERENCE TO RELATED APPLICATIONS

This application claims the benefit of and priority to U.S. Provisional Application Ser. No. 61/533,122, filed Sep. 9, 2011, the contents of which are incorporated by reference herein in theft entirety.

BACKGROUND

The present disclosure relates to advanced timing and time transfer for timing and time transfer for satellite constellations. In particular, it relates to advanced timing and time transfer for satellite constellations using crosslink ranging and an accurate time source.

SUMMARY

The present disclosure relates to a method, system, and apparatus for advanced timing and time transfer for satellite constellations using crosslink ranging and an accurate time source. In particular, the present disclosure reaches a method for timing for a satellite constellation. The disclosed method involves transmitting, by at least one first satellite, at least one crosslink ranging signal to at least one second satellite. In one or more embodiments, at least one first satellite and/or at least one second satellite is a timing satellite with a synchronization time. The method further involves receiving, by at least one second satellite, at least one crosslink ranging signal. Also, the method involves calculating at least one ranging measurement from at least one first satellite to at least one second satellite by using an amount of time elapsed from the transmitting of at least one crosslink ranging signal to the receiving of at least one crosslink ranging signal. Further, the method involves calculating an estimate of time and frequency for at least one first satellite and at least one second satellite relative to each other to synchronize the time and the frequency for at least one first satellite and/or at least one second satellite by using at least one ranging measurement and/or the synchronization time from at least one timing satellite.

In one or more embodiments, at least one first satellite is a timing satellite with the synchronization time, and at least one second satellite is a non-timing satellite without the synchronization time. In at least one embodiment, the synchronization time is an accurate time. In some embodiments, at least one timing satellite obtains the synchronization time via at least one global positioning system (GPS) signal, at least one global navigation satellite system (GLONASS) signal, at least one Galileo satellite signal, at least one BeiDou Navigation System signal, and/or an atomic dock. In one or more embodiments, the synchronization time is not an accurate time. In at least one embodiment, at least one second satellite is a timing satellite with the synchronization time, and at least one first satellite is a non-timing satellite without the synchronization time.

In at least one embodiment, the method further involves generating at least one correction signal for synchronizing the time and the frequency for at least one first satellite and/or at least one second satellite, and transmitting at least one correction signal to at least one first satellite and/or at least one second satellite. In some embodiments, at least one first satellite and at least one second satellite are a Lower Earth Orbiting (LEO) satellite, a Medium Earth Orbiting (MEO) satellite, and/or a Geosynchronous Earth Orbiting (GEO) satellite. In some embodiments, the LEO satellite is an Iridium LEO satellite or an Iridium Next Generation LEO satellite.

In one or more embodiments, the disclosed method employs an Iridium LEO satellite constellation. In at least one embodiment, each of the Iridium LEO satellites in the constellation has an antenna geometry that transmits forty-eight (48) spot beams with a distinctive spot beam pattern. In at least one embodiment, at least one crosslink signal may be transmitted from at least one of the Iridium satellites in the constellation. The forty-eight (48) spot beams of an Iridium satellite may be used to transmit localized signals to receiving sources (e.g., reference stations) located on or near the Earth's surface. It should be noted that when employing one of the above-described Iridium LEO satellites, the transmission signal power is sufficiently strong enough to allow for the signal to penetrate into an indoor environment reliably, and may employ signal encoding methods in order to do so. It should be further noted that this system could employ at least one next generation Iridium satellite, or a combination of existing Iridium satellites with the next generation Iridium satellite configuration.

In one or more embodiments, the method further involves transmitting, by at least one timing satellite, at least one positioning signal to at least one reference station. The method also involves receiving, by at least one reference station, at least, one positioning signal. Also, the method involves calculating at least one positioning ranging measurement from at least one timing satellite to at least one reference station by using an amount of time elapsed from the transmitting of at least one positioning signal to the receiving of at least one positioning signal. Further, the method involves calculating an estimate of orbital positioning for at least one first satellite and/or at least one second satellite by using at least one ranging measurement, the synchronization time, positioning data from at least one timing satellite, and/or at least one positioning ranging measurement. In at least one embodiment, at least one timing satellite obtains the positioning data via at least one global positioning system (GPS) signal, at least one global navigation satellite system (GLONASS) signal, at least one BeiDou Navigation System signal, and/or at least one Galileo satellite signal.

In at least one embodiment, the method further involves transmitting, by at least one reference station, at least one positioning signal to at least one timing satellite. Also, the method involves receiving, by at least one timing satellite, at least one positioning signal. In addition, the method involves calculating at least one positioning ranging measurement from at least one reference station to at least one timing satellite by using an amount of time elapsed from the transmitting of at least one positioning signal to the receiving of at least one positioning signal (i.e. the time of arrival (TOA) of the receiving of at least one positioning signal in reference to the dock of the receiver, which in this case is on the timing satellite). Further, the method involves calculating an estimate of orbital positioning for at least one first satellite and/or at least one second satellite by using at least one ranging measurement, the synchronization time, positioning data from at least one timing satellite, and/or at least one positioning ranging measurement. In some embodiments, at least one timing satellite obtains the positioning data via at least one global positioning system (GPS) signal, at least one global navigation satellite system (GLONASS) signal, at least one BeiDou Navigation System signal, and/or at least one Galileo satellite signal.

In one or more embodiments, a method for timing for a satellite constellation involves transmitting, by at least one first satellite, at least one first crosslink ranging signal to at least one second satellite. In at least one embodiment, at least one first satellite and/or at least, one second satellite is a timing satellite with a synchronization time. The method further involves receiving, by at least one second satellite, at least one first crosslink ranging signal. Also, the method involves transmitting, by at least one second satellite, at least one second crosslink ranging signal to at least one first satellite. In addition, the method involves receiving, by at least one first satellite, at least one second crosslink ranging signal. Additionally, the method involves calculating at least one first ranging measurement from at least one first satellite to at least one second satellite by using an amount of time elapsed from the transmitting of at least one first crosslink ranging signal to the receiving of at least one first crosslink ranging signal. Also, the method involves calculating at least one second ranging measurement from at least one second satellite to at least one first satellite by using an amount of time elapsed from the transmitting of at least one second crosslink ranging signal to the receiving of at least one second crosslink ranging signal. Further, the method involves calculating an estimate of time and frequency for at least one first satellite and at least one second satellite relative to each other to synchronize the time and the frequency for at least one first satellite and/or at least one second satellite by using at least one first ranging measurement, at least one second ranging measurement, and/or the synchronization time from at least one timing satellite.

In at least one embodiment, a system for timing for a satellite constellation involves at least one first satellite configured to transmit at least one crosslink ranging signal to at least one second satellite. The system further involves at least one second satellite configured to receive at least one crosslink ranging signal. In one or more embodiments, at least one first satellite and/or at least one second satellite is a timing satellite with a synchronization time. Also, the system involves at least one processor configured to calculate at least one ranging measurement from at least one first satellite to at least one second satellite by using an amount of time elapsed from the transmitting of at least one crosslink ranging signal to the receiving of at least one crosslink ranging signal. Further, the system involves at least one processor further configured to calculate an estimate of time and frequency for at least one first satellite and at least one second satellite relative to each other to synchronize the time and the frequency for at least one first satellite and/or at least one second satellite by using at least one ranging measurement and/or the synchronization time from at least one timing satellite.

In one or more embodiments, at least one processor is further configured to generate at least one correction signal for synchronizing the time and the frequency for at least one first satellite and/or at least one second satellite. In at least one embodiment, the system further involves at least one transmitter that is configured to transmit at least one correction signal to at least one first satellite and/or at least one second satellite.

In at least one embodiment, at least one timing satellite is further configured to transmit at least one positioning signal to at least one reference station. In some embodiments, at least one reference station is configured to receive at least one positioning signal. In one or more embodiments, at least one processor is further configured to calculate at least one positioning ranging measurement from at least one timing satellite to at least one reference station by using an amount of time elapsed from the transmitting of at least one positioning signal to the receiving of at least one positioning signal, and to calculate an estimate of orbital positioning for at least one first satellite and/or at least one second satellite by using at least one ranging measurement, the synchronization time, positioning data from at least one timing satellite, and/or at least one positioning ranging measurement.

In one or more embodiments, the system further involves at least one reference station configured to transmit at least one positioning signal to at least one timing satellite. In at least one embodiment, at least one timing satellite is further configured to receive at least one positioning inquiry signal. In some embodiments, at least one processor is further configured to calculate at least one positioning ranging measurement from at least one reference station to at least one timing satellite by using an amount of time elapsed from the transmitting of at least one positioning signal to the receiving of at least one positioning signal, and to calculate an estimate of orbital positioning for at least one first satellite and/or at least one second satellite by using at least one ranging measurement, the synchronization time, positioning data from at least one timing satellite, and/or at least one positioning ranging measurement.

In at least one embodiment, a system for timing for a satellite constellation involves at least one first satellite configured to transmit at least one first crosslink ranging signal to at least one second satellite, and to receive at least one second crosslink ranging signal. The system further involves at least one second satellite configured to receive at least one first crosslink ranging signal, and to transmit at least one second crosslink ranging signal. In one or more embodiments, at least one first satellite and/or at least one second satellite is a timing satellite with a synchronization time. Also, the system involves at least one processor configured to calculate at least one first ranging measurement from at least one first satellite to at least one second satellite by using an amount of time elapsed from the transmitting of at least one first crosslink ranging signal to the receiving of at least one first crosslink ranging signal. In addition, the system involves at least one processor further configured to calculate at least one second ranging measurement from at least one second satellite to at least one first satellite by using an amount of time elapsed from the transmitting of at least one second crosslink ranging signal to the receiving of at least one second crosslink ranging signal. Further, the system involves at least one processor further configured to calculate an estimate of time and frequency for at least one first satellite and at least one second satellite relative to each other to synchronize the time and the frequency for at least one first satellite and/or at least one second satellite by using at least one first ranging measurement, at least one second ranging measurement, and/or the synchronization time from at least one timing satellite.

In one or more embodiments, the disclosed system and method employ an Iridium Next Generation satellite constellation where a subset of the constellation is equipped with GPS receivers or an alternate accurate timing source. This subset, spread across all the planes, provides a connection to continuous, accurate time and frequency within the constellation via crosslink ranging to satellites not equipped with GPS receivers.

In at least one embodiment, the Iridium Next Generation satellite constellation includes a subset of the constellation which are equipped with GPS receivers or an alternate accurate timing source which are used to provide accurate timing data to crosslinked Iridium (existing constellation) satellites.

In one or more embodiments, the satellite anchored to the accurate timing source (i.e. the timing satellite) and/or paired satellite (i.e. the non-timing satellite) may be used to transmit a positioning, navigation, and timing (PN&T) message to a user on the ground with an enabled receiver so that they can maintain accurate time or use it as a ranging signal.

In at least one embodiment, the satellite crosslinks may span across multiple constellations with different missions.

In one or more embodiments, the satellite crosslinks may span over at least two sets (Le, such as two blocks of satellites with similar missions such as Iridium and Iridium Next Generation satellites) of satellites with similar if not the same missions.

In at least one embodiment, at least one satellite may solve for position and time using GPS satellites. In some embodiments, at least one satellite may solve for position and time using a combination of GPS and Iridium satellites.

In one or more embodiments, the disclosed system involves at least one LEO satellite with an accurate timing source (i.e. a timing satellite), at least one LEO satellite capable of crosslinking with previous said LEO satellite to receive accurate timing data (i.e. a non-timing satellite), and at least one ground reference station to relate the accurate time reference to the LEO satellites' time reference.

In at least one embodiment, the disclosed system involves a constellation of LEO satellites where a subset of the LEO satellites are enabled with an accurate timing source (e.g., a GPS receiver) (i.e. timing satellites) and where the rest of the satellites (i.e. non-timing satellites) in the constellation are capable of crosslinking with the previous satellites (i.e. the timing satellites) in such a way that all of the satellites within the constellation are capable of receiving accurate timing data. The system further involves at least one ground reference station to relate the accurate time reference to the LEO satellites time reference.

In one or more embodiments, the disclosed system involves at least one LEO satellite with an accurate timing source (i.e. timing satellite), and at least one LEO satellite (i.e. non-timing satellite) capable of crosslinking with previous said LEO satellite (i.e. timing satellite) to receive accurate timing data. The system further involves at least one ground reference station to relate the accurate time reference to the LEO satellites time reference and an enabled user receiver device.

In at least one embodiment, satellite operators may use crosslinked measurements for satellite operations, such as to estimate frequency drift of the satellites oscillators and, with the satellite's time bias and bias rate terms, calculate the commands to adjust the satellite's time and frequency to within allowable bounds.

In one or more embodiments, to make the most advantage of the precisely timed time of arrival (TOA) measurements, the invention makes precise TOA and Doppler measurements with ground reference stations to optimally estimate the radial component of the orbit, which can be used for orbit determination.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for advanced timing and time transfer for satellite constellations. In particular, the system relates to advanced timing and time transfer for satellite constellations using crosslink ranging and an accurate time source.

This present disclosure relates generally to systems for providing improved positioning, navigation, and timing information for oscillator calibration and more specifically, to using at least one satellite with accessibility to an accurate time source to calibrate the local oscillator on a crosslink paired satellite. In at least one embodiment, precision time on a subset of satellites with crosslinking capabilities is used to distribute time through a network of crosslinked satellites.

The disclosed system and method have at least five main features. The first main feature relates to estimating time from a paired satellite through a crosslink. This particular feature is based on a method for estimating precise time on satellite within a satellite constellation without ground-based tracking. A crosslink networked set of satellites may make accurate time of arrival (TOA) measurements to their immediately adjacent networked pairs (i.e. relative to their own space vehicle (SV) oscillator and knowledge of time). A benefit of this is that it allows networked satellite pairs to leverage the benefits of the other satellite, potentially without the high cost associated with equipping all satellites similarly. In at least one embodiment of this invention, the crosslink ranging may be completed as part of the "normal" crosslink communication protocol. In one embodiment, in order to be more cost effective, some of the satellites may be equipped with GPS receivers that can determine GPS time and frequency very accurately, and the GPS time and frequency are used to calibrate the equipped satellite's oscillator. In this way, the GPS equipped satellites provide an anchoring of all the measurements to GPS Lime. AH the crosslink measurements may be collected and filtered to estimate the bias and bias rate of each SV time with respect to GPS time. These bias and bias rate terms may be used by receivers on the ground to correct any SV time to GPS time. It should be noted that instead of utilizing GPS signals for synchronization, the disclosed system and method may employ various different means to provide synchronization including, but not limited to, at least one global navigation satellite system (GLONASS) signal, at least one Galileo satellite signal, at least one BeiDou Navigation System signal, and/or an atomic clock. In addition, it should be noted that the disclosed system and method may be used with various types of satellite constellations, such as a LEO, a GEO, and/or a MEO satellite constellation.

The second main feature of the disclosed system and method relates to secondary applications for the crosslink measurements. For this feature, the same set of crosslink measurements may be used by the constellation operators for required satellite operations, such as to estimate frequency drift of the satellite oscillators and, with the satellite time bias and bias rate terms, to calculate the commands to adjust the satellite time and frequency to within allowable bounds.

The third main feature of the present disclosure relates to on-orbit bias processing to minimize ground infrastructure requirements. For this feature, the processing of the TOA measurements to estimate satellite time bias and bias rate may be performed in a distributed manner among the crosslinked networked satellites to minimize or all together eliminate the need for ground processing and, thus, make the estimated terms available without ground contact.

The fourth main feature of the disclosed system and method relates to paired satellites that leverage benefits from a GPS anchored satellite. This main feature is similar to the GPS-anchored satellite using its GPS-based time and frequency information to synchronize the local oscillator. For this feature, the remaining satellites may synchronize their oscillators by the time and frequency information estimated in this process.

The fifth main feature of the disclosed system and method relates to orbit determination. For this feature, the crosslink TOA measurements and the sparse anchoring with GPS equipped satellites are used to perform orbit determination. The crosslink TOA measurements are processed to assure a common time base for all measurements. The crosslink measurements are insensitive to relatively small changes in satellite altitude since the lines of sight for the measurements are nearly perpendicular to the nadir angle altitude. To make the most advantage of the precisely Limed TOA measurements, the invention makes precise TOA and Doppler measurements with ground reference stations to optimally estimate the radial component of the orbit.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Systems and methods according to one or more embodiments are provided for improving satellite-based position, navigation, and timing (PN&T) through the utilization of crosslinking and an accurate time source to provide accurate timing information to calibrate the local oscillator on a paired satellite. In at least one embodiment, the paired satellite may use this to conduct typical on-orbit operations as part of a crosslinking protocol. In at least one embodiment, more than one crosslink can be used to distribute time across to at least two paired satellites (e.g., one satellite sends information to two satellites one forward and one aft in the same plane). In at least one embodiment, precision time on a subset of satellites with crosslinking capabilities is used to distribute time through a network of crosslinked satellites. In at least one embodiment, this process can be used to distribute time across a whole constellation. In at least one embodiment, the disclosed methods can further be used to determinate absolute or relative locations of points by measurement of distances for orbit determination.

In some embodiments, the paired satellite will be used to transmit a PN&T message (i.e. accurate satellite position and timing information) to a user on the ground so that they can improve time accuracy or use the satellite signal as a ranging signal. In at least one embodiment, communication signals from at least one LEO satellite have been adapted to provide time and frequency to enabled receivers on the ground through the use of satellite crosslinks and an accurate timing source. In at least one embodiment, at least one LEO satellite is an Iridium satellite (i.e. from the existing Iridium constellation) and/or an Iridium Next Generation satellite.

In at least one embodiment, the accurate timing source includes at least one GPS receiver being installed on a subset of the LEO satellites with crosslink capability within a satellite constellation. In at least one embodiment, crosslinks may span between at least two different satellite configurations with reasonable crosslink compatibility.

In at least one embodiment, GPS receivers are installed on a subset of satellites within the LEO constellation, and are used to maintain more accurate time on those satellites without a similar installed timing source, such as a GPS receiver, through the passing of timing information over the satellites' associated crosslinks.

In related inventions, it has been shown that communication signals from a LEO satellite can be adapted to provide time and frequency to enabled receivers on or near the ground that are within the footprint of the satellite. A critical part of this process is to have knowledge of the satellite's time relative to some standard at the time of signal transmission. A convenient time standard is GPS time, however, estimating the time of each satellite could require an extensive network of monitoring stations on the ground, depending on the performance of the reference oscillator on the satellite. Integrating GPS receivers onto LEO satellites provides the best means of determining position, velocity, and time aboard the satellite. As the orbit is sufficiently low, availability and accuracy of GPS position and timing information are roughly comparable to the case in which a GPS receiver is on the surface of the Earth. However, the drawback for a constellation of satellites is that installing such a receiver on each satellite can be very costly and, thus, may inhibit implementation, which is why for the exemplary embodiment only a subset of the constellation includes this costly hardware in order to maximize performance and minimize cost of the architecture. As noted previously, the crosslinked satellites also add another advantage as they allow the system to operate with less ground monitoring stations as measurements can be passed through the crosslinks.

For a constellation of satellites, such as Iridium, with bi-directional crosslink communication capability, accurate TOA measurements may be used to estimate satellite time relative to each other. TOA measurements will allow a relation between how the local satellite's oscillator is operating in terms of frequency error as a function of time or rather a bias of time relative to GPS. In at least one embodiment, TOA measurements from the ground may be used to define the relationship between their relative time to GPS time for a plane of satellites.

Figure 1:
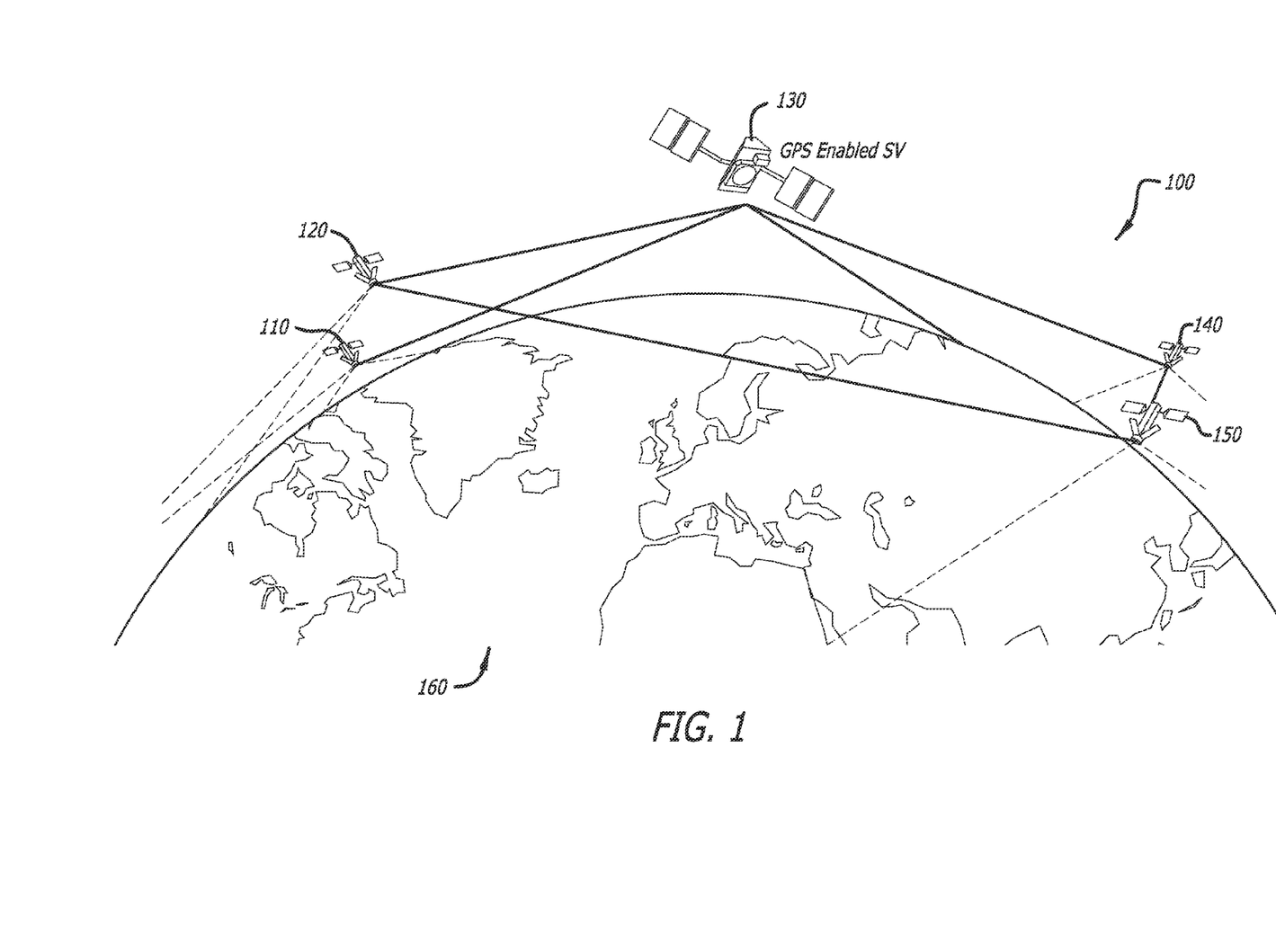
FIG. 1 depicts a schematic diagram of an example constellation of satellites that may be employed by the disclosed system for advanced timing and time transfer for satellite constellations using crosslink ranging and an accurate time source, in accordance with at least one embodiment of the present disclosure.

FIG. 1 depicts a schematic diagram 100 of an example constellation of satellites that may be employed by the disclosed system for advanced timing and time transfer for satellite constellations using crosslink ranging and an accurate time source, in accordance with at least one embodiment of the present disclosure. In this figure, five satellites 110, 120, 130, 140, and 150 are shown to be orbiting the Earth 160. Satellites 110, 120, 140, and 150 are Iridium LEO satellites, and satellite 130 is a LEO Iridium Next Generation satellite. One (satellite 130) of these five satellites is equipped with a GPS receiver to receive GPS signals from a GPS satellite (not shown). As such, this satellite 130 is referred to as a timing satellite. The remaining four (satellites 110, 120, 140, and 150) of the five satellites are not equipped with GPS receivers and, thus, they are referred to as non-timing satellites. The five satellites transmit and receive crosslink signals to their nearby satellites in the constellation. For example, satellite 130 is shown to be transmitting and receiving crosslink signals from satellites 110, 120, and 140.

Figure 2:
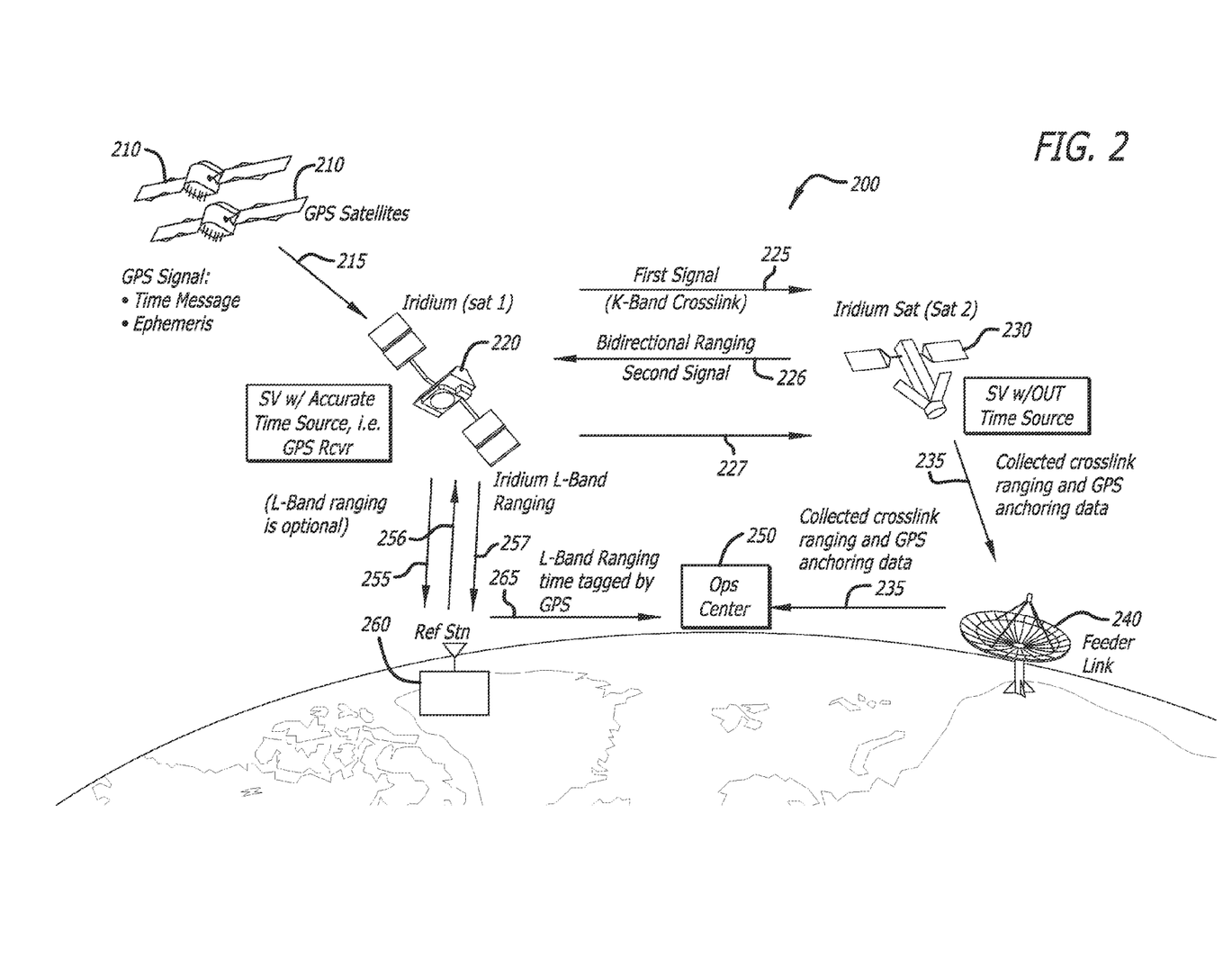
FIG. 2 is a schematic diagram of the disclosed system for advanced timing and time transfer for satellite constellations using crosslink ranging and an accurate time source, in accordance with at least one embodiment of the present disclosure.

FIG. 2 is a schematic diagram 200 of the disclosed system for advanced timing and time transfer for satellite constellations using crosslink ranging and an accurate time source, in accordance with at least one embodiment of the present disclosure. In this figure, at least one GPS satellite 210 is shown to be transmitting a GPS signal 215 to a first Iridium satellite (Sat 1) 220. The GPS signal 215 contains accurate time information and, optionally, ephemeris data. Sat 1 220, which is a LEO Iridium Next Generation satellite, is equipped with a GPS receiver and, thus, is capable of receiving the GPS signal 215. Sat 1 220 passes the GPS timing information it receives from the GPS signal 215 to the operations center 250 and, optionally in some embodiments, disciplines its onboard oscillator to the GPS timing. Since Sat 1 220 is able to receive accurate time information, Sat 1 220 is referred to as a "timing satellite". It should be noted that in other embodiments, a timing satellite may be able to obtain accurate time information through means other than by a GPS signal, such as by an atomic clock.

Sat 1 220 is also shown to be transmitting a first K-band crosslink ranging signal 225 to another Iridium satellite (Sat 2) 230. The first K-bank crosslink ranging signal 225 contains accurate time information. Unlike Sat 1 220, Sat 2 230, which is a LEO Iridium satellite, is not equipped with a GPS receiver and does not have accurate time information. As such, Sat 2 230 is referred to as a "non-timing satellite". After Sat 2 230 receives the K-bank crosslink ranging signal 225, Sat 2 230 sends a second K-bank crosslink ranging signal 226 to Sat 1 220. Once Sat 1 220 receives the second K-band crosslink ranging signal 226 from Sat 2 230, Sat 1 220 sends a ranging K-band crosslink signal 227 to Sat 2 230. The ranging K-band crosslink signal 227 contains crosslink ranging data (e.g., the amount of time elapsed from the transmitting of the first K-band crosslink signal 225 to the receiving of the first K-band crosslink signal 225, and the amount of time elapsed from the transmitting of the second K-band crosslink ranging signal 226 to the receiving of the second K-band crosslink signal 226) as well as accurate time information obtained by Sat 1 220 from the GPS signal 215. Sat 2 230 then transmits a signal 235, wirelessly and optionally by wire, to a ground operations center 250 via an Earth-based feeder link 240. The signal 235 contains the crosslink ranging data and the accurate time information.

Once the operations center 250 receives the signal 235, at least one processor at the operations center 250 calculates a crosslink ranging measurement from Sat 1 220 to Sat 2 230 by using the amount of time elapsed from the transmitting of the first K-band crosslink signal 225 to the receiving of the first K-band crosslink signal 225 and/or by using the amount of time elapsed from the transmitting of the second K-band crosslink ranging signal 226 to the receiving of the second K-band crosslink signal 226. In addition, at least one processor at the operations center 250 calculates an estimate of time and frequency for Sat 1 220 and Sat 2 230 relative to each other and to GPS time (i.e. accurate time) to synchronize the time and the frequency for Sat 1 and Sat 2 by using the crosslink ranging measurement and the accurate time information, which was obtained by Sat 1 220 from the GPS signal 215.

In some embodiments, Sat 1 220 optionally sends a first L-band positioning signal 255 to a ground reference station 260. After the reference station 260 receives the first L-band positioning signal 255, the reference station 260 sends a second L-band positioning signal 256 to Sat 1 220. Once Sat 1 220 receives the second L-band positioning signal 256 from the reference station 260, Sat 1 220 sends a ranging L-band positioning signal 257 to the reference station 260. The ranging L-band positioning signal 257 contains radial ranging data (e.g., the amount of time elapsed from the transmitting of the first L-band positioning signal 255 to the receiving of the first L-band positioning signal 255, and the amount of time elapsed from the transmitting of the second L-band positioning signal 256 to the receiving of the second L-band positioning signal 256); accurate time information and ephemeris data obtained by Sat 1 220 from the GPS signal 215; and optionally crosslink ranging data (e.g., the amount of time elapsed from the transmitting of the first K-band crosslink signal 225 to the receiving of the first K-band crosslink signal 225, and the amount of time elapsed from the transmitting of the second K-band crosslink ranging signal 226 to the receiving of the second K-band crosslink signal 226). Then, the reference station 260 transmits a signal 265, either wirelessly and/or by wire, to the ground operations center 250. The signal 265 contains the radial ranging data, the accurate time information, the ephemeris data, and optionally the crosslink ranging data.

Once the operations center 250 receives the signal 265, at least one processor at the operations center 250 calculates a radial ranging measurement from Sat 1 220 to the reference station 260 by using the amount of time elapsed from the transmitting of the first L-band positioning signal 255 to the receiving of the first L-band positioning signal 255, and/or the amount of time elapsed from the transmitting of the second L-band positioning signal 256 to the receiving of the second L-band positioning signal 256. Also, at least one processor at the operations center 250 calculates an estimate of orbital positioning for Sat 1 220 and/or Sat 2 230 by using the crosslink ranging measurement, the accurate time information, the ephemeris data, and the radial ranging measurement.

It should be noted that in alternative embodiments, the crosslink ranging may be only unidirectional ranging instead of bidirectional ranging as is shown in FIG. 2. Also in other embodiments, the radial ranging may be unidirectional ranging (either uplink ranging or downlink ranging) instead of bidirectional ranging as is shown in FIG. 2. Also, it should be noted that in some embodiments, for both the unidirectional ranging and bidirectional ranging scenarios, the satellite sending the first crosslink ranging signal is a timing satellite and the satellite receiving the first crosslink ranging signal is a non-timing satellite, as is the case in FIG. 2. In other embodiments, for both the unidirectional ranging and bidirectional ranging scenarios, the satellite sending the first crosslink ranging signal is a non-timing satellite and the satellite receiving the first crosslink ranging signal is a timing satellite. Additionally, it should be noted that for the disclosed system and method there may be various other different combinations of which of the satellites in the constellation are timing satellites and which are non-timing satellites.

In addition, it should be noted that in some embodiments, at least one processor for performing the calculations is located on a satellite as opposed to located at a ground station (i.e. a terrestrial location), such as the ground operations center 250. As such, it follows that the data needed by at least one processor to perform the calculations may be transmitted to at least one processor by various different routes, which may be wireless and/or wired. Also, it should be noted that the crosslink signals and the radial positioning signals may be other frequencies other than K-band and L-band. In addition, in one or more embodiments, the disclosed system and method do not employ a feeder link to pass the signals. In at least one embodiment, the disclosed system and method employ more than one feeder link to pass the signals. Additionally, it should be noted that in other embodiments, the timing satellite may receive its timing information from at least one global navigation satellite system (GLONASS) signal, at least one Galileo satellite signal, at least one BeiDou Navigation System signal, and/or an atomic clock. For these cases, the timing satellite would be equipped with a GLONASS receiver, a Galileo receiver, and/or a BeiDou receiver in order to receive GLONASS signals, Galileo satellite signals, and/or BeiDou signals, respectively. In addition, it should be noted that in some embodiments, the timing information is not an accurate time, and the timing satellite may simply obtain timing information from its own internal oscillator.

Figure 3:
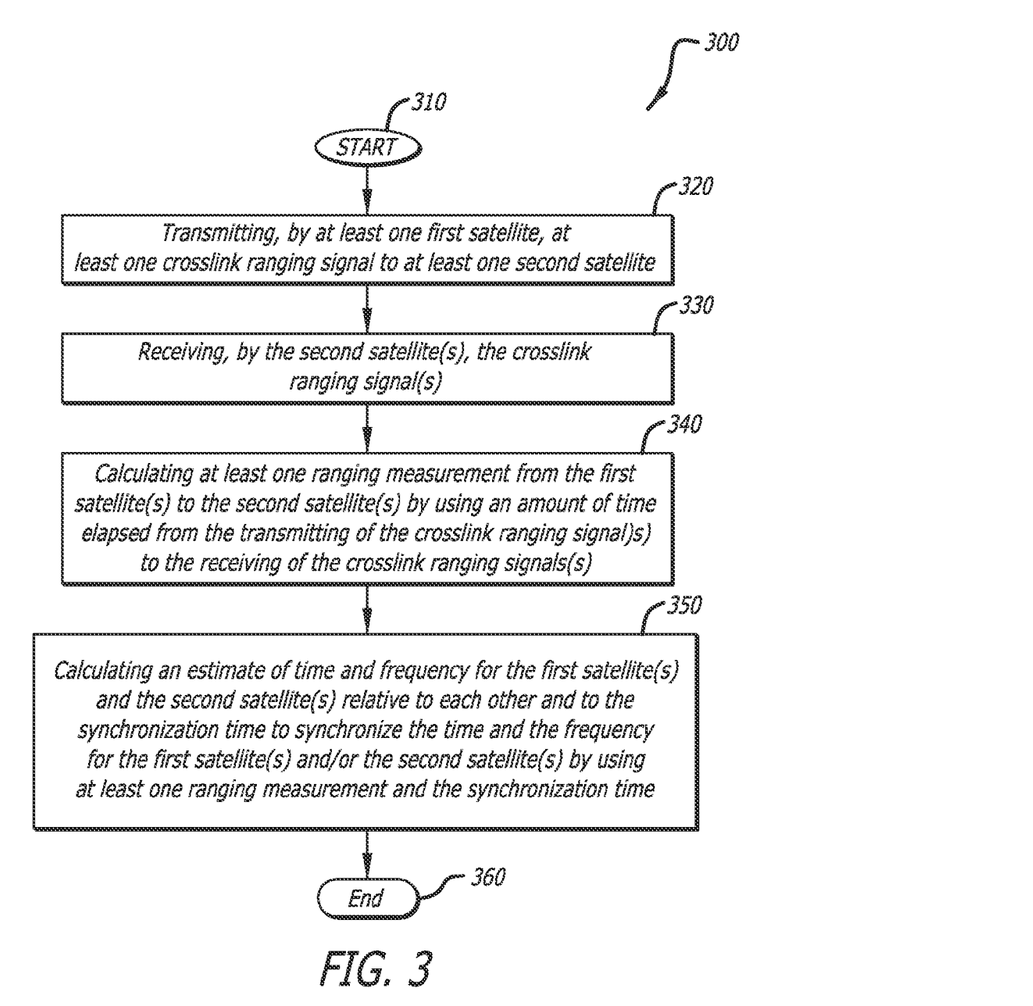
FIG. 3 is a flow diagram for the disclosed method for advanced timing and time transfer for satellite constellations using crosslink ranging and an accurate time source, in accordance with at least one embodiment of the present disclosure.

FIG. 3 is a flow diagram for the disclosed method 300 for advanced timing and time transfer for satellite constellations using crosslink ranging and an accurate time source, in accordance with at least one embodiment of the present disclosure. At the start 310 of the method 300, at least one first satellite transmits at least one crosslink ranging signal to at least one second satellite 320. In one or more embodiments, at least one first satellite and/or at least one second satellite is a timing satellite with a synchronization time (e.g., GPS time). The second satellite(s) receives the crosslink ranging signal(s) from the first satellite(s) 330.

After the second satellite(s) receives the crosslink ranging signal(s), at least one processor calculates at least one ranging measurement from the first satellite(s) to the second satellite(s) by using an amount of time elapsed from the transmitting of the crosslink ranging signal(s) to the receiving of the crosslink ranging signal(s) 340. Then, at least one processor calculates an estimate of time and frequency for the first satellite(s) and the second satellite(s) relative to each other and to the synchronization time to synchronize the time and the frequency for the first satellite(s) and/or the second satellite(s) by using at least one ranging measurement and a synchronization time 350. After at least one processor calculates an estimate of time and frequency, the method ends 360.

Figure 4:
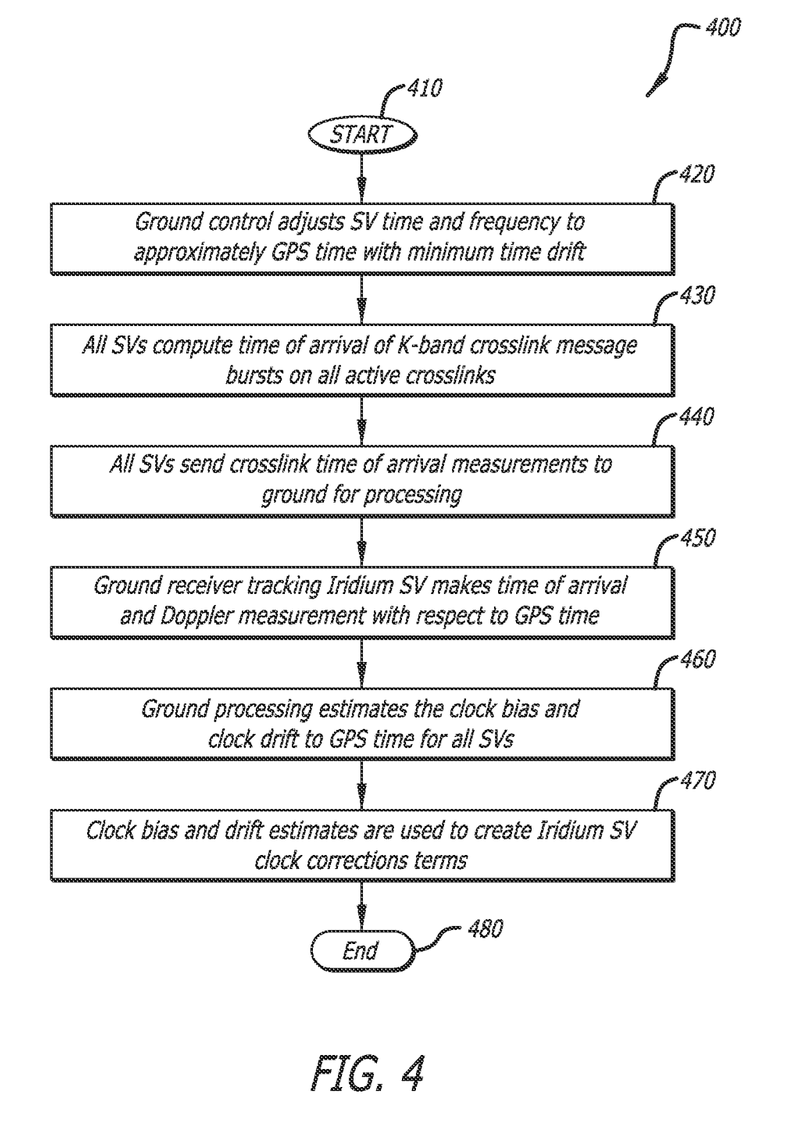
FIG. 4 is a flow diagram for a detailed method for time synchronization using crosslink ranging and a ground station clock reference, in accordance with at least one embodiment of the present disclosure.

FIG. 4 is a flow diagram for a detailed method 400 for time synchronization using crosslink ranging and a ground station clock reference, in accordance with at least one embodiment of the present disclosure. At the start 410 of this method 400, ground control adjusts the space vehicle (SV) (e.g., Iridium satellite) time and frequency to approximately GPS time and minimum drift 420. During this step (step 420), ground control estimates the SV time, frequency, and orbit on each ground station (e.g., telemetry, tracking, and control/command (TTAC) Earth Station) pass. The ground station then uses this data to create commands to adjust the SV time and frequency, at certain or various time intervals (e.g., it generates commands approximately every 12 hours). Then, the SV adjusts its data clock (i.e. the time) and its master frequency oscillator as commanded by the commands. The data clock is adjusted over multiple L-band frames so as not to interfere with other services.

After each of the SV's time and frequency are adjusted, all of the SVs compute the time of arrival (TOA) of the K-band crosslink message bursts on all of the active crosslinks 430. The TOA is based on the adjustment made by the SV crosslink receiver data clock to maintain data synchronization.

After all of the SVs compute the TOAs, all of the SVs send their crosslink TOA measurements to the ground for processing 440. The TOA measurements can be the raw measurements or represented by a curve fit. After all of the SVs send the crosslink TOA measurements to the ground, the ground receiver that is tracking the Iridium SV makes TOA and Doppler measurements with respect to GPS time 450. For this step (step 450), the ground receiver has a common frequency standard that is driving both the GPS receiver and the Iridium receiver. The TOA and Doppler measurements are related to GPS time.

After the ground receiver makes the measurements, ground processing estimates the clock bias and clock drift relative to GPS time for all SVs 460. The updated rate is based on the rate of the TOA for which the SV crosslink fits to the quadratic. Centralized processing uses the Iridium ephemeris data to calculate time of flight values for all inter-SV and SV-ground contacts for which there is TOA data. Then, centralized processing removes the time of flight values from measurements. Centralized processing then estimates dock bias and drift of SVs relative to each other, anchoring it to GPS time when ground receiver tracking data is available.

After ground processing makes the estimations, the dock bias and drift estimates are used to create Iridium SV dock correction terms 470. After the correction terms are created, the method 400 ends 480.

Figure 5:
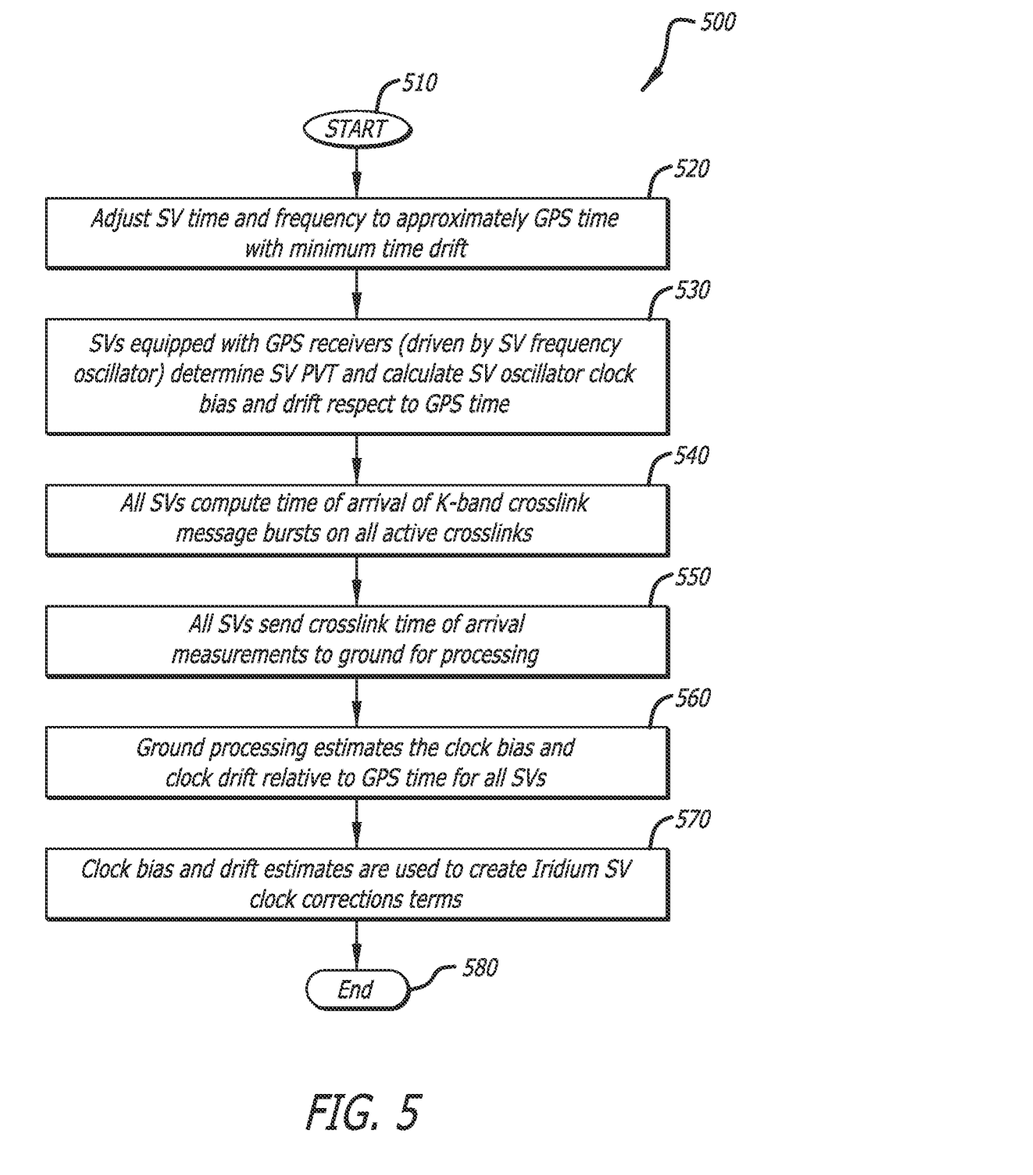
FIG. 5 is a flow diagram for a detailed method for time synchronization using crosslink ranging and at least one Iridium satellite equipped with a GPS receiver, in accordance with at least one embodiment of the present disclosure.

FIG. 5 is a flow diagram for a detailed method 500 for time synchronization using crosslink ranging and at least one Iridium satellite equipped with a GPS receiver, in accordance with at least one embodiment of the present disclosure. At the start 510 of this method 500, ground control adjusts the space vehicle (SV) (e.g., Iridium satellite) time and frequency to approximately GPS time and minimum drift 520. During this step (step 520), ground control estimates the SV time, frequency, and orbit on each ground station (e.g., TTAC Earth Station) pass. The ground station then uses this data to create commands to adjust the SV time and frequency, at certain or various time intervals (e.g., it generates commands approximately every 12 hours). Then, the SV adjusts its data clock (i.e. the time) and its master frequency oscillator as commanded the by commands. The data clock is adjusted over multiple L-band frames so as not to interfere with other services.

After each of the SV's time and frequency is adjusted, the SVs equipped with GPS receivers, which are driven by the SV frequency oscillator, each determine their position, velocity, and time (PVT), and calculate their oscillator clock bias and drift with respect to GPS time 530. Then, all of the SVs compute the time of arrival (TOA) of the K-band crosslink message bursts on all of the active crosslinks 540. The TOA is based on the adjustment made by the SV crosslink receiver data clock to maintain data synchronization.

After all of the SVs compute the TOAs, all of the SVs send their crosslink TOA measurements to the ground for processing 550. The TOA measurements can be the raw measurements or represented by a curve fit. The SVs equipped with GPS receivers send their calculated clock bias and drift to the ground for processing.

After all of the SVs send their TOA measurements to the ground for processing, ground processing estimates the clock bias and clock drift relative to GPS time for all SV's 560. Centralized processing uses the Iridium ephemeris data to calculate time of flight values for all inter-SV and SV-ground contacts for which there is TOA data. Then, centralized processing removes the time of flight values from measurements. Centralized processing then estimates clock bias and drift of SVs relative to each other, anchoring it to GPS time using the SV's GPS-based oscillator clock bias and drive measurements.

After ground processing makes the estimations, the clock bias and drift estimates are used to create Iridium SV clock correction terms 570. After the correction terms are created, the method 500 ends 580.

Figure 6:
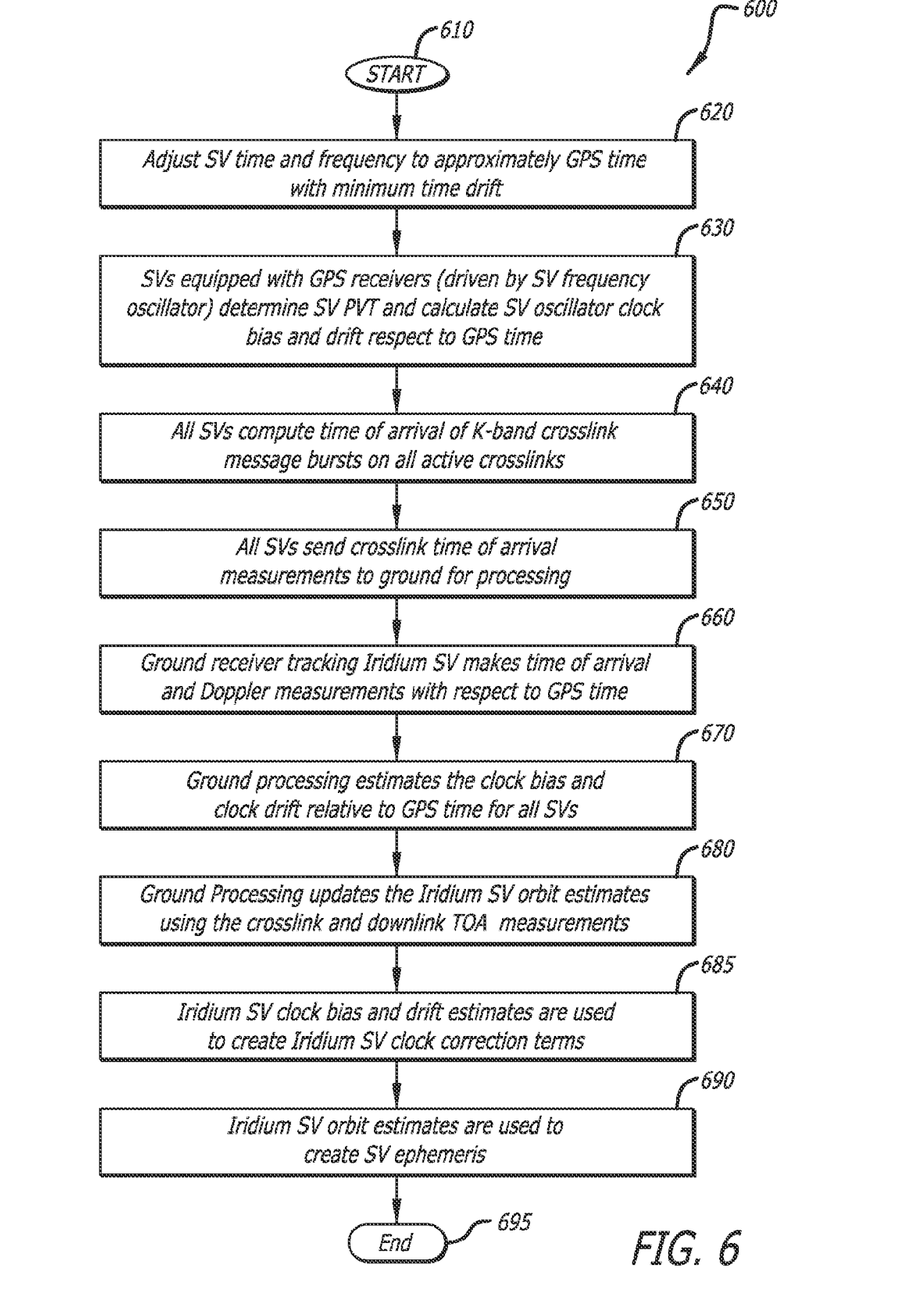
FIG. 6 is a flow diagram for a detailed method for time synchronization and orbit determination using crosslink ranging and ground time of arrival (TOA) measurements to estimate the Iridium constellation ephemeris, in accordance with at least one embodiment of the present disclosure.

FIG. 6 is a flow diagram for a detailed method 600 for time synchronization and orbit determination using crosslink ranging and ground time of arrival (TOA) measurements to estimate the Iridium constellation ephemeris, in accordance with at least one embodiment of the present disclosure. At the start 610 of this method 600, ground control adjusts the space vehicle (SV) (e.g., Iridium satellite) time and frequency to approximately GPS time and minimum drift 620. During this step (step 620), ground control estimates the SV time, frequency, and orbit on each ground station (e.g., TTAC Earth Station) pass. The ground station then uses this data to create commands to adjust the SV time and frequency, at certain or various time intervals (e.g., it generates commands approximately every 12 hours). Then, the SV adjusts its data clock (i.e. the time) and its master frequency oscillator as commanded the by commands. The data clock is adjusted over multiple L-band frames so as not to interfere with other services.

After each of the SV's time and frequency is adjusted, the SVs equipped with GPS receivers, which are driven by the SV frequency oscillator, each determine their position, velocity, and time (PVT), and calculate their oscillator clock bias and drift with respect to GPS time 630. Then, all of the SVs compute the time of arrival (TOA) of the K-band crosslink message bursts on all of the active crosslinks 640. The TOA is based on the adjustment made by the SV crosslink receiver data clock to maintain data synchronization.

After all of the SVs compute the TOAs, all of the SVs send their crosslink TOA measurements to the ground for processing 650. The TOA measurements can be the raw measurements or represented by a curve fit. The SVs equipped with GPS receivers send their calculated clock bias and drift to the ground for processing.

After all of the SVs send the crosslink TOA measurements to the ground, the ground receiver that is tracking the Iridium SV makes TOA and Doppler measurements with respect to GPS time 660. For this step (step 660), the ground receiver has a common frequency standard that is driving both the GPS receiver and the Iridium receiver. The TOA and Doppler measurements are related to GPS time.

After the ground receiver makes the measurements, ground processing estimates the clock bias and clock drift relative to GPS time for all SVs 670. Centralized processing uses the Iridium ephemeris data to calculate time of flight values for all inter-SV and SV-ground contacts for which there is TOA data. Then, centralized processing removes the time of flight values from measurements. Centralized processing then estimates clock bias and drift of SVs relative to each other, anchoring it to GPS time using the Iridium SV GPS-based oscillator clock bias and drift measurements.

After ground processing makes the estimations, ground processing updates the Iridium SV orbit estimations using the crosslink and downlink (i.e. radial) TOA measurements 680. Then, the Iridium SV clock bias and drift estimates are used to create Iridium SV clock correction terms 685. After the correction terms are created, the Iridium SV orbit estimates are used to create SV ephemeris 690. After SV ephemeris are created, the method 600 ends 695.

Figure 7:
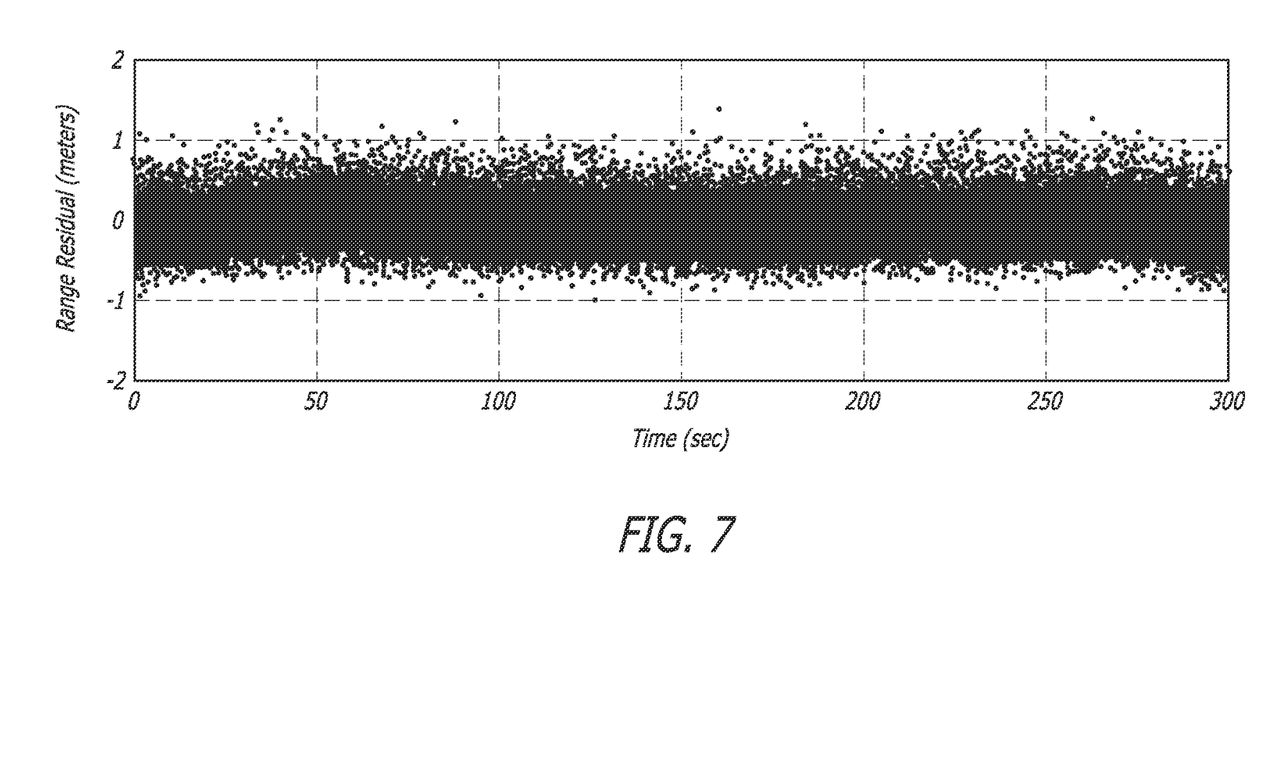
FIG. 7 is a graph depicting the accuracy achievable with crosslink ranging, in accordance with at least one embodiment of the present disclosure.

FIG. 7 is a graph depicting the accuracy achievable with crosslink ranging, in accordance with at least one embodiment of the present disclosure. The graph shows the range error (vertical scale, in meters (m)) as a function of time (horizontal scale, seconds (s)). This accuracy provides single crosslink timing accuracies of ~20 nanoseconds and range accuracies of ~6 meters. The entire network of Iridium satellites is expected to have timing errors of less than 40 nanoseconds and range errors of less than 12 meters. Redundant measurements can be employed to further reduce these errors.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for timing for a satellite constellation, the method comprising:
   transmitting, by at least one first satellite, at least one crosslink ranging signal to at least one second satellite, wherein at least one of the at least one first satellite and the at least one second satellite is a timing satellite with a synchronization time;
   receiving, by the at least one second satellite, the at least one crosslink ranging signal;
   calculating at least one ranging measurement from the at least one first satellite to the at least one second satellite by using an amount of time elapsed from the transmitting of the at least one crosslink ranging signal to the receiving of the at least one crosslink ranging signal; and
   calculating an estimate of time and frequency for the at least one first satellite and the at least one second satellite relative to each other and to the synchronization time to synchronize the time and the frequency for at least one of the at least one first satellite and the at least one second satellite by using at least one of the at least one ranging measurement and the synchronization time from the at least one timing satellite; and
   calculating an estimate of orbital positioning for at least one of the at least one first satellite and the at least one second satellite by using at least one of the at least one ranging measurement, the synchronization time, positioning data from the at least one timing satellite, and at least one positioning ranging measurement.

2. The method of claim 1, wherein the at least one first satellite is a timing satellite with the synchronization time, and the at least one second satellite is a non-timing satellite without the synchronization time.

3. The method of claim 1, wherein the synchronization time is an accurate time.

4. The method of claim 3, wherein the at least one timing satellite obtains the synchronization time via at least one of at least one global positioning system (GPS) signal, at least one global navigation satellite system (GLONASS) signal, at least one Galileo satellite signal, at least one BeiDou Navigation System signal, and an atomic clock.

5. The method of claim 1, wherein the synchronization time is not an accurate time.

6. The method of claim 1, wherein the at least one second satellite is a timing satellite with the synchronization time, and the at least one first satellite is a non-timing satellite without the synchronization time.

7. The method of claim 1, wherein the method further comprises generating at least one correction signal for synchronizing the time and the frequency for at least one of the at least one first satellite and the at least one second satellite; and
transmitting the at least one correction signal to at least one of the at least one first satellite and the at least one second satellite.

8. The method of claim 1, wherein the at least one first satellite and the at least one second satellite are at least one of a Lower Earth Orbiting (LEO) satellite, a Medium Earth Orbiting (MEO) satellite, and a Geosynchronous Earth Orbiting (GEO) satellite.

9. The method of claim 1, wherein the method further comprises:
transmitting, by the at least one timing satellite, at least one positioning signal to at least one reference station;
receiving, by the at least one reference station, the at least one positioning signal; and
calculating the at least one positioning ranging measurement from the at least one timing satellite to the at least one reference station by using an amount of time elapsed from the transmitting of the at least one positioning signal to the receiving of the at least one positioning signal.

10. The method of claim 9, wherein the at least one timing satellite obtains the positioning data via at least one of at least one global positioning system (GPS) signal, at least one global navigation satellite system (GLONASS) signal, at least one BeiDou Navigation System signal, and at least one Galileo satellite signal.

11. The method of claim 1, wherein the method further comprises:
transmitting, by at least one reference station, at least one positioning signal to the at least one timing satellite;
receiving, by the at least one timing satellite, the at least one positioning signal;
calculating at least one positioning ranging measurement from the at least one reference station to the at least one timing satellite by using an amount of time elapsed from the transmitting of the at least one positioning signal to the receiving of the at least one positioning signal; and
calculating an estimate of orbital positioning for at least one of the at least one first satellite and the at least one second satellite by using at least one of the at least one ranging measurement, the synchronization time, positioning data from the at least one timing satellite, and the at least one positioning ranging measurement.

12. The method of claim 11, wherein the at least one timing satellite obtains the positioning data via at least one of at least one global positioning system (GPS) signal, at least one global navigation satellite system (GLONASS) signal, at least one BeiDou Navigation System signal, and at least one Galileo satellite signal.

13. A method for timing for a satellite constellation, the method comprising:
transmitting, by at least one first satellite, at least one first crosslink ranging signal to at least one second satellite,
wherein at least one of the at least one first satellite and the at least one second satellite is a timing satellite with a synchronization time;
receiving, by the at least one second satellite, the at least one first crosslink ranging signal;
transmitting, by the at least one second satellite, at least one second crosslink ranging signal to the at least one first satellite;
receiving, by the at least one first satellite, the at least one second crosslink ranging signal;
calculating at least one first ranging measurement from the at least one first satellite to the at least one second satellite by using an amount of time elapsed from the transmitting of the at least one first crosslink ranging signal to the receiving of the at least one first crosslink ranging signal;
calculating at least one second ranging measurement from the at least one second satellite to the at least one first satellite by using an amount of time elapsed from the transmitting of the at least one second crosslink ranging signal to the receiving of the at least one second crosslink ranging signal
calculating an estimate of time and frequency for the at least one first satellite and the at least one second satellite relative to each other and to the synchronization time to synchronize the time and the frequency for at least one of the at least one first satellite and the at least one second satellite by using at least one of the at least one first ranging measurement, the at least one second ranging measurement, and the synchronization time from the at least one timing satellite; and
calculating an estimate of orbital positioning for at least one of the at least one first satellite and the at least one second satellite by using at least one of the at least one first ranging measurement, the at least one second ranging measurement, the synchronization time, positioning data from the at least one timing satellite, and at least one positioning ranging measurement.

14. A system for timing for a satellite constellation, the system comprising:
at least one first satellite configured to transmit at least one crosslink ranging signal to at least one second satellite;
the at least one second satellite configured to receive the at least one crosslink ranging signal,
wherein at least one of the at least one first satellite and the at least one second satellite is a timing satellite with a synchronization time;
at least one processor configured to calculate at least one ranging measurement from the at least one first satellite to the at least one second satellite by using an amount of time elapsed from the transmitting of the at least one crosslink ranging signal to the receiving of the at least one crosslink ranging signal;
the at least one processor further configured to calculate an estimate of time and frequency for the at least one first satellite and the at least one second satellite relative to each other and to the synchronization time to synchronize the time and the frequency for at least one of the at least one first satellite and the at least one second satellite by using at least one of the at least one ranging measurement and the synchronization time from the at least one timing satellite; and
the at least one processor is further configured to calculate an estimate of orbital positioning for at least one of the at least one first satellite and the at least one second satellite by using at least one of the at least one ranging measurement, the synchronization time, positioning data from the at least one timing satellite, and at least one positioning ranging measurement.

15. The system of claim 14, wherein the at least one first satellite is a timing satellite with the synchronization time, and the at least one second satellite is a non-timing satellite without the synchronization time.

16. The system of claim 14, wherein the synchronization time is an accurate time.

17. The system of claim 16, wherein the at least one timing satellite obtains the synchronization time via at least one of at least one global positioning system (GPS) signal, at least one global navigation satellite system (GLONASS) signal, at least one Galileo satellite signal, at least one BeiDou Navigation System signal, and an atomic clock.

18. The system of claim 14, wherein the synchronization time is not an accurate time.

19. The system of claim 14, wherein the at least one second satellite is a timing satellite with the synchronization time, and the at least one first satellite is a non-timing satellite without the synchronization time.

20. The system of claim 14, wherein the at least one processor is further configured to generate at least one correction signal for synchronizing the time and the frequency for at least one of the at least one first satellite and the at least one second satellite.

21. The system of claim 20, wherein the system further comprises at least one transmitter that is configured to transmit the at least one correction signal to at least one of the at least one first satellite and the at least one second satellite.

22. The system of claim 14, wherein the at least one first satellite and the at least one second satellite are at least one of a Lower Earth Orbiting (LEO) satellite, a Medium Earth Orbiting (MEO) satellite, and a Geosynchronous Earth Orbiting (GEO) satellite.

23. The system of claim 14, wherein the at least one timing satellite is further configured to transmit at least one positioning signal to at least one reference station;
the at least one reference station is configured to receive the at least one positioning signal; and
the at least one processor is further configured to calculate the at least one positioning ranging measurement from the at least one timing satellite to the at least one reference station by using an amount of time elapsed from the transmitting of the at least one positioning signal to the receiving of the at least one positioning signal.

24. The system of claim 23, wherein the at least one timing satellite obtains the positioning data via at least one of at least one global positioning system (GPS) signal, at least one global navigation satellite system (GLONASS) signal, at least one BeiDou Navigation System signal, and at least one Galileo satellite signal.

25. The system of claim 14, wherein the system further comprises:
at least one reference station configured to transmit at least one positioning signal to the at least one timing satellite;
the at least one timing satellite is further configured to receive the at least one positioning inquiry signal; and
the at least one processor is further configured to calculate at least one positioning ranging measurement from the at least one reference station to the at least one timing satellite by using an amount of time elapsed from the transmitting of the at least one positioning signal to the receiving of the at least one positioning signal, and to calculate an estimate of orbital positioning for at least one of the at least one first satellite and the at least one second satellite by using at least one of the at least one ranging measurement, the synchronization time, positioning data from the at least one timing satellite, and the at least one positioning ranging measurement.

26. The system of claim 25, wherein the at least one timing satellite obtains the positioning data via at least one of at least one global positioning system (GPS) signal, at least one global navigation satellite system (GLONASS) signal, at least one BeiDou Navigation System signal, and at least one Galileo satellite signal.

27. A system for timing for a satellite constellation, the system comprising:
at least one first satellite configured to transmit at least one first crosslink ranging signal to at least one second satellite, and to receive at least one second crosslink ranging signal;
the at least one second satellite configured to receive the at least one first crosslink ranging signal, and to transmit the at least one second crosslink ranging signal,
wherein at least one of the at least one first satellite and the at least one second satellite is a timing satellite with a synchronization time;
at least one processor configured to calculate at least one first ranging measurement from the at least one first satellite to the at least one second satellite by using an amount of time elapsed from the transmitting of the at least one first crosslink ranging signal to the receiving of the at least one first crosslink ranging signal;
the at least one processor further configured to calculate at least one second ranging measurement from the at least one second satellite to the at least one first satellite by using an amount of time elapsed from the transmitting of the at least one second crosslink ranging signal to the receiving of the at least one second crosslink ranging signal
the at least one processor further configured to calculate an estimate of time and frequency for the at least one first satellite and the at least one second satellite relative to each other and to the synchronization time to synchronize the time and the frequency for at least one of the at least one first satellite and the at least one second satellite by using at least one of the at least one first ranging measurement, the at least one second ranging measurement, and the synchronization time from the at least one timing satellite; and
the at least one processor further configured to calculate an estimate of orbital positioning for at least one of the at least one first satellite and the at least one second satellite by using at least one of the at least one first ranging measurement, the at least one second ranging measurement, the synchronization time, positioning data from the at least one timing satellite, and at least one positioning ranging measurement.

* * * * *